United States Patent
Robertsson et al.

(10) Patent No.: US 7,164,619 B2
(45) Date of Patent: Jan. 16, 2007

(54) METHOD OF PROCESSING MARINE SEISMIC DATA AND A METHOD OF SEISMIC SURVEYING

(76) Inventors: Johan Robertsson, 19 Station Road, Fulbourn, Cambridge CB15ER (GB); Andrew Curtis, 1 Windsor Street (1F2), Edinburgh, EH7 5LA (GB); Dirk-Jan Van Manen, St. Edmundsvei 49B, 0280-Oslo (NO)

( * ) Notice: Subject to any disclaimer, the term of this patent is extended or adjusted under 35 U.S.C. 154(b) by 205 days.

(21) Appl. No.: 10/466,980

(22) PCT Filed: Jan. 24, 2002

(86) PCT No.: PCT/GB02/00280

§ 371 (c)(1),
(2), (4) Date: Jul. 21, 2003

(87) PCT Pub. No.: WO02/059647

PCT Pub. Date: Aug. 1, 2002

(65) Prior Publication Data

US 2004/0076077 A1 Apr. 22, 2004

(30) Foreign Application Priority Data

Jan. 25, 2001 (GB) ................... 0101936.3
Apr. 30, 2001 (GB) ................... 0110573.3

(51) Int. Cl.
*G01V 1/36* (2006.01)
*G01V 1/38* (2006.01)

(52) U.S. Cl. ................ 367/21; 367/15; 367/38; 367/75

(58) Field of Classification Search ............ 367/36, 367/37, 38, 15, 75, 21
See application file for complete search history.

(56) References Cited

U.S. PATENT DOCUMENTS 4,597,066 A   6/1986   Frasier ............... 367/38

(Continued)

FOREIGN PATENT DOCUMENTS

WO     WO 99/54758     10/1999

(Continued)

OTHER PUBLICATIONS

Yung, S.K. et al., "An Example of Seismic Time Picking by Third-Order Biocoherence" Exploration Geophsicist, USA, vol. 62, No. 6., pp. 1947-1952, XP000733682, ISN: 0016-8033 (1997).

(Continued)

*Primary Examiner*—Ian J. Lobo
(74) *Attorney, Agent, or Firm*—WesternGeco, L.L.C.

(57) ABSTRACT

A method of determining seismic properties of a layer of the seabed, in particular a surface or near-surface layer (5), comprises directing seismic energy propagating in a first mode at a boundary face of the layer so as to cause partial mode conversion of the seismic energy at the boundary face. For example partial mode conversion may occur when seismic energy propagates upwards through the interface between a surface or near-surface layer (5) and the basement (6), owing to the difference in seismic properties between the surface or near-surface layer (5) and the basement (6). In the invention, the two modes of seismic energy—that is the initial mode and the mode generated by mode conversions at the interface—are received at a receiver. The difference in travel time of the two modes between the interface and the receiver is determined from the seismic data acquired by the receiver.

32 Claims, 13 Drawing Sheets

U.S. PATENT DOCUMENTS

| | | | | |
|---|---|---|---|---|
| 4,683,557 A | * | 7/1987 | Willis | 367/57 |
| 5,200,928 A | * | 4/1993 | MaCleod | 367/57 |
| 5,610,875 A | | 3/1997 | Gaiser | 367/75 |

FOREIGN PATENT DOCUMENTS

WO  WO 00/75693 A1  12/2000

OTHER PUBLICATIONS

PCT/GB02/0082 International Search Report dated May 31, 2002.

* cited by examiner

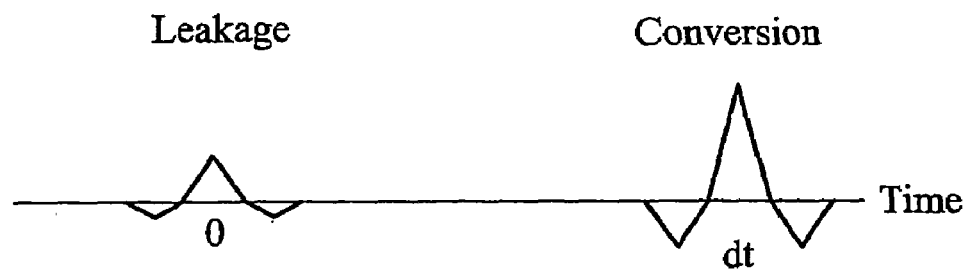
FIG 4
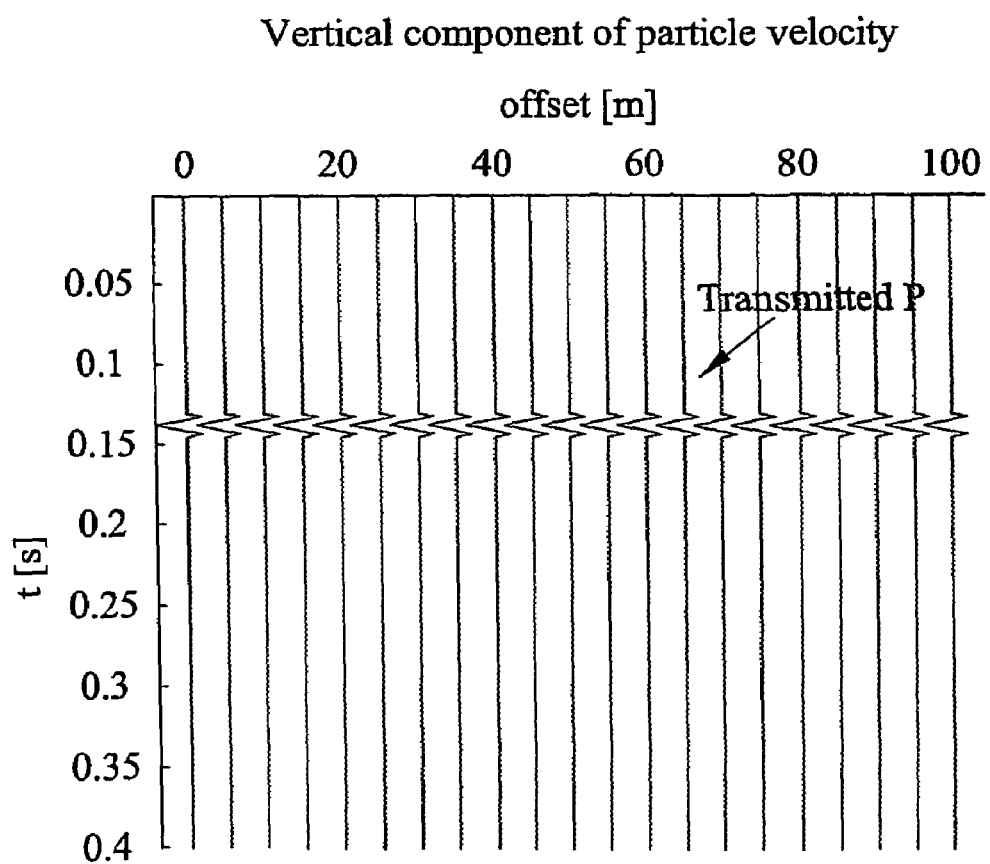
FIG 5ᵃ

Radial component of particle velocity

Deconvolved results / Receiver functions

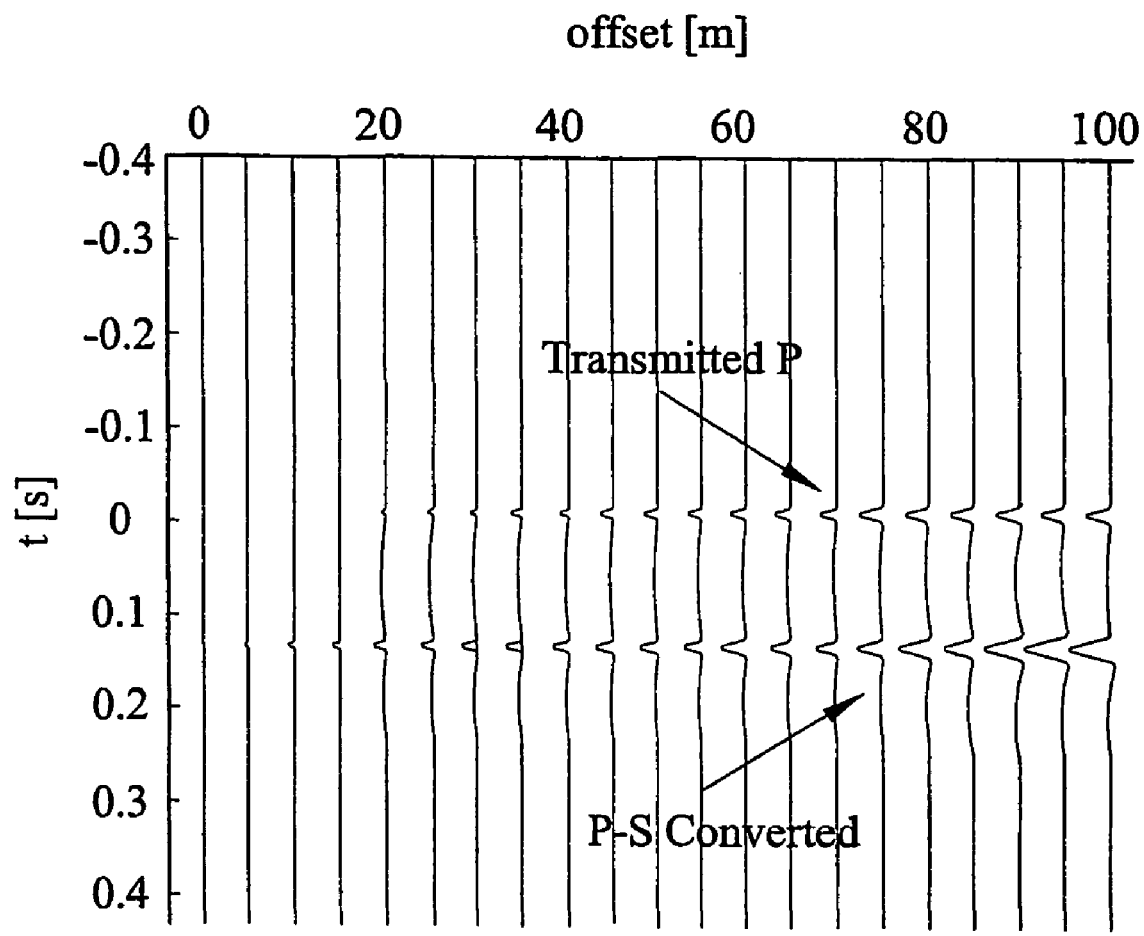
FIG 6<sup>b</sup>

Common offset profile
vertical component
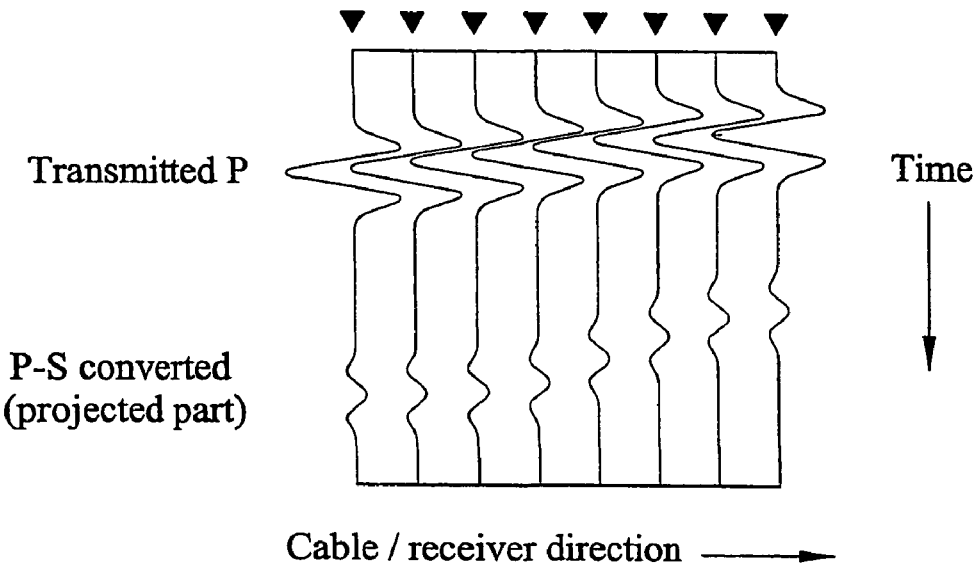
Transmitted P
P-S converted
(projected part)
Time
Cable / receiver direction ⟶
FIG 9$^a$
Common offset profile
radial component
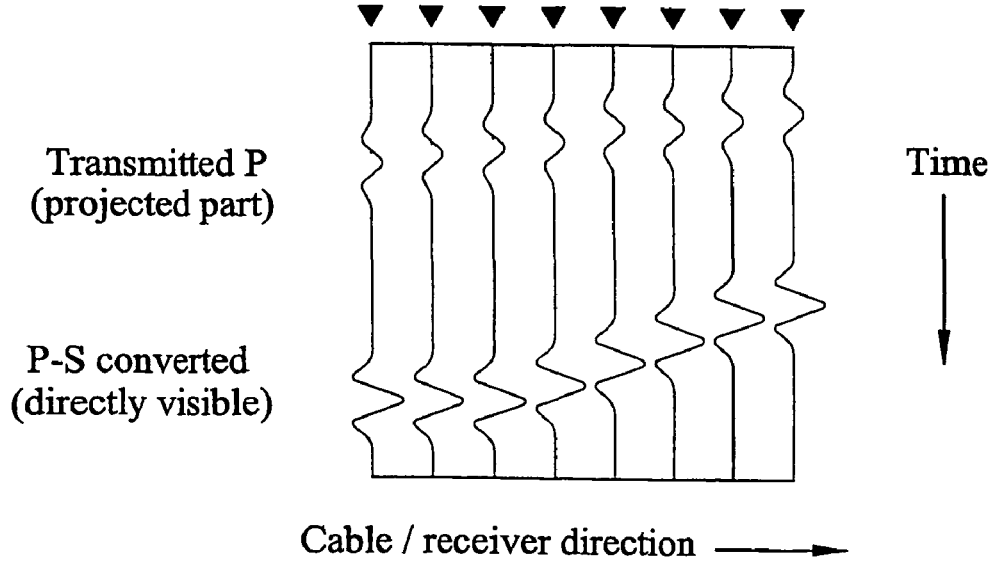
Transmitted P
(projected part)
P-S converted
(directly visible)
Time
Cable / receiver direction ⟶
FIG 9$^b$

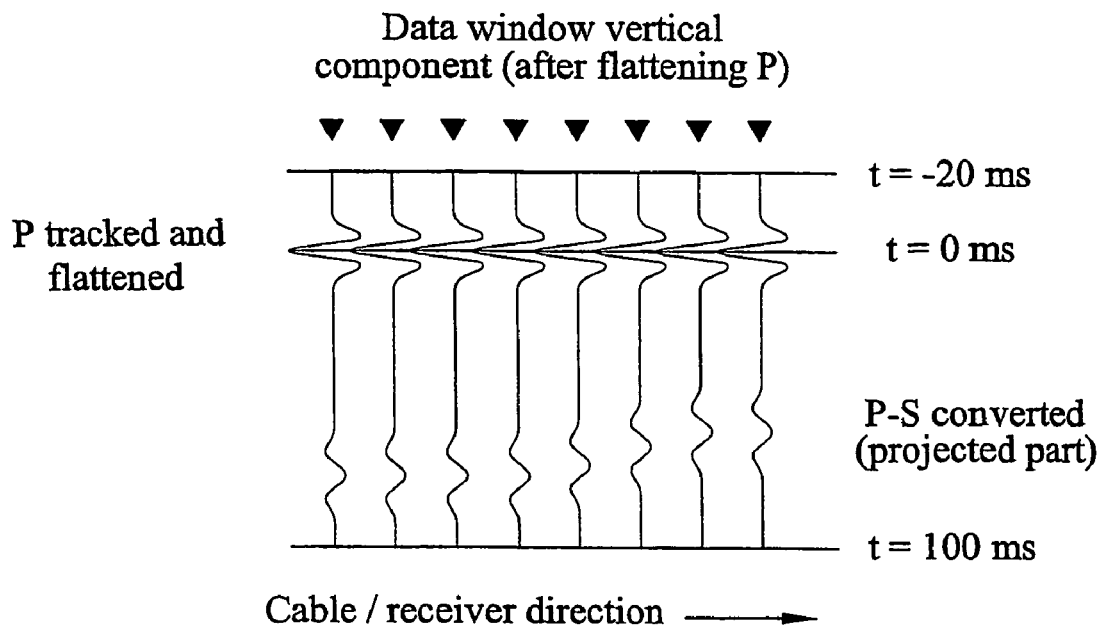
FIG 10<sup>a</sup>
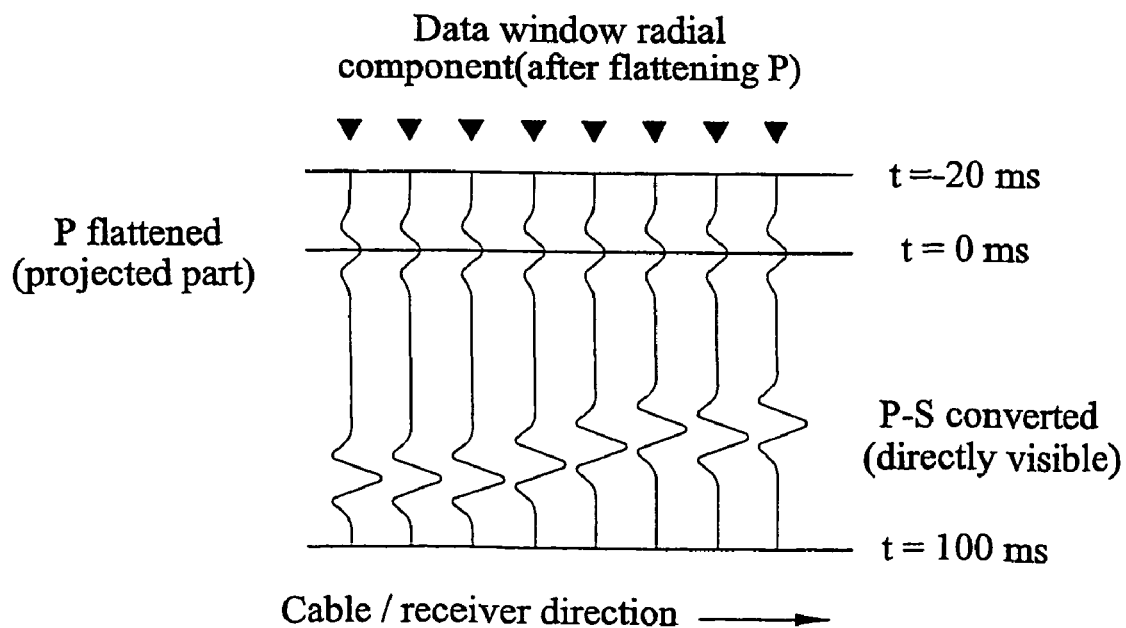
FIG 10<sup>b</sup>

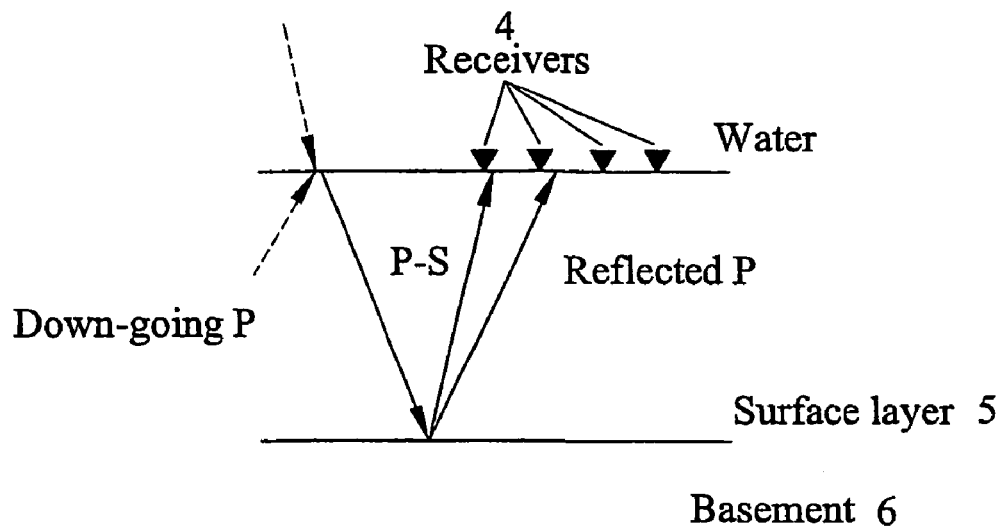
FIG 12<sup>a</sup>
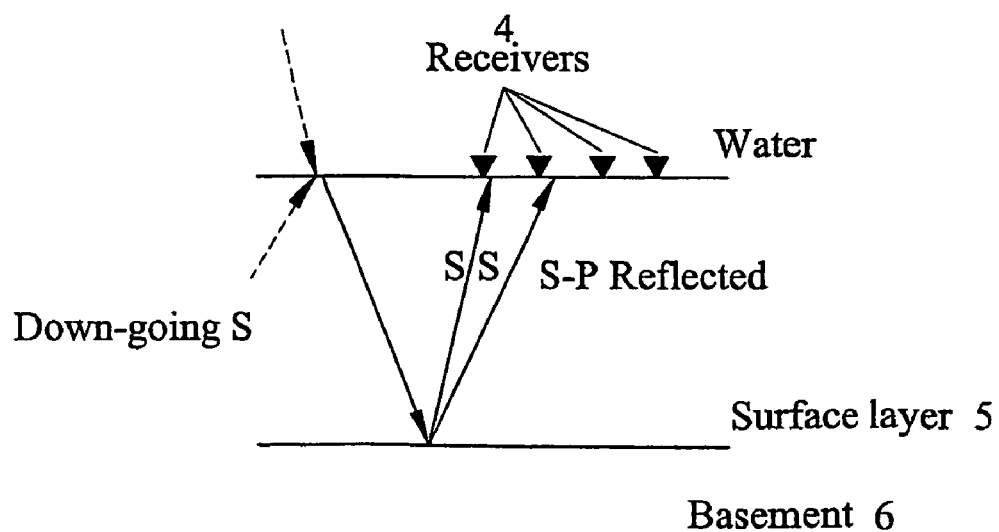
FIG 12<sup>b</sup>

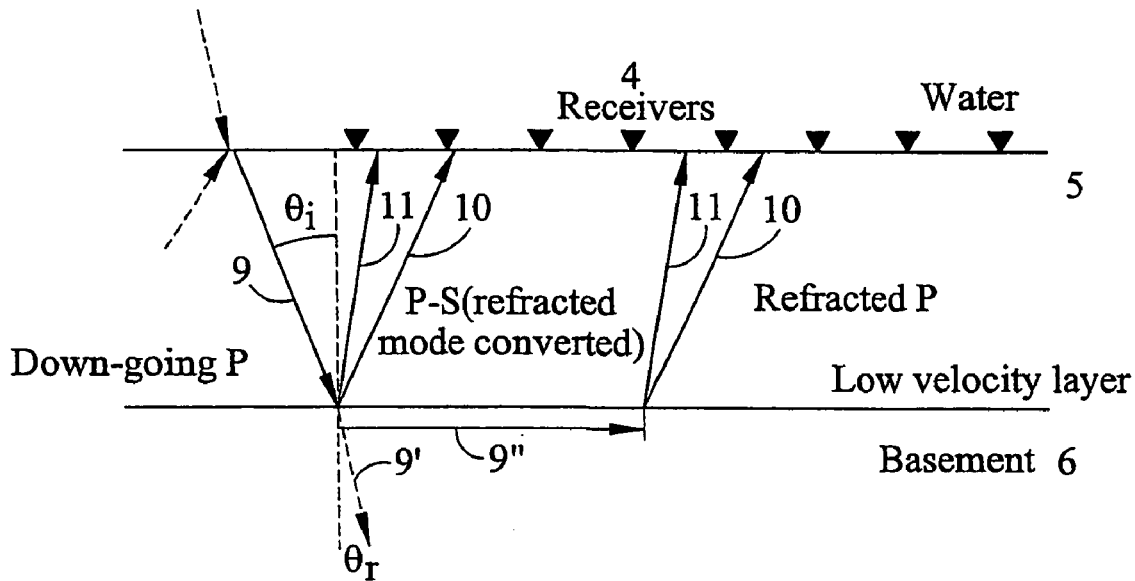
FIG 13<sup>a</sup>
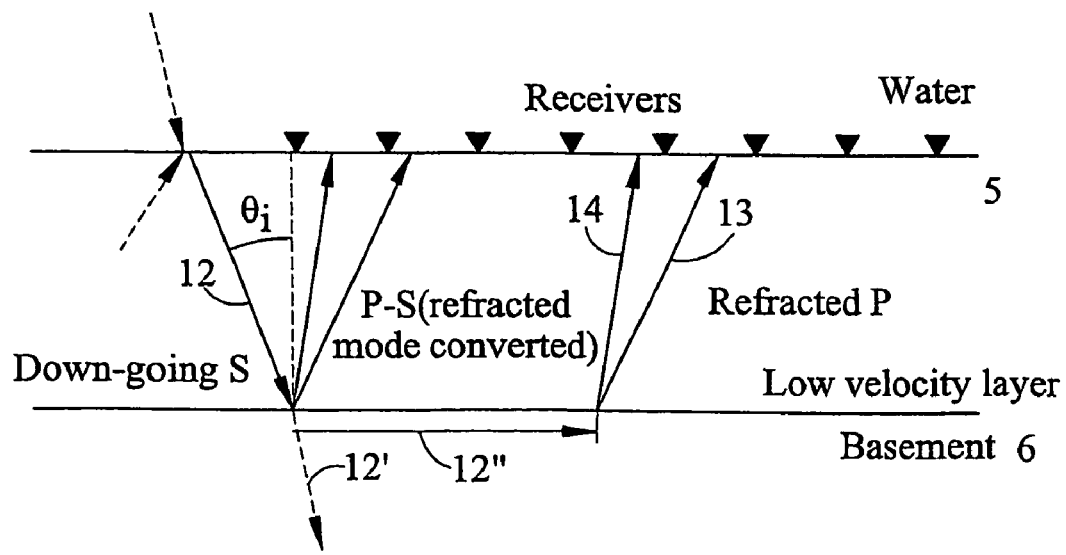
FIG 13<sup>b</sup>

METHOD OF PROCESSING MARINE SEISMIC DATA AND A METHOD OF SEISMIC SURVEYING

BACKGROUND OF THE INVENTION

1. Field of the Invention

The present invention relates to a method of processing marine seismic data, and in particular relates to a method of processing marine seismic data that includes two modes of seismic energy propagation, one mode arising from partial mode conversion at a boundary of a layer of the earth. The method of the invention provides an estimate of static shifts caused by a layer at or near the earth's surface that has different seismic properties from the underlying layers. The invention also relates to a method of seismic surveying that includes processing acquired seismic data in the above way.

2. Description of the Related Art

FIG. 1 is a schematic view of a marine, seabed seismic surveying arrangement. In this surveying arrangement, seismic energy is emitted by a seismic source 1 that is suspended beneath the sea-surface from a towing vessel 2. The seismic energy is emitted downwards, passes into the earth's interior and is reflected by a geological feature that acts as a reflector 3. The reflected seismic energy passes upwards through the earth's interior, into the sea and is detected by a seismic receiver 4 disposed on the sea-bed. Information about the earth's interior is obtained, for instance, by determining the travel time of seismic energy from the seismic source 1 to the receiver 4. Only one reflector 3 is shown in FIG. 1 but, in practice, a number of geological features within the earth's interior will act as partial reflectors for the seismic energy. Moreover, only one source 1 and one receiver 4 are shown in FIG. 1 but in practice a marine seismic surveying arrangement may have an array of sources and an array of receivers.

The geological structure of the earth is not uniform. One problem in processing marine seismic data is that frequently there is a layer 5 at or near the surface whose properties may well be significantly different from the properties of the underlying geological structure 6 hereinafter referred to as the "basement"). This can occur if, for example, there is a layer at or near the earth's surface that is less consolidated than the basement. In particular, the velocity of seismic energy may be significantly lower in the surface or near-surface layer 5 than in the basement 6, and such a surface or near-surface layer is thus generally known as a "low-velocity layer" (or LVL). This difference in velocity will produce a shift in the travel time of seismic energy compared to the travel time that would be recorded if the surface or near-surface layer and the basement had identical seismic properties, and these shifts in travel time are generally known as "static shifts", or just "statics".

The low-velocity layer 5 is shown as a surface layer FIG. 1, but it need not extend to the surface and there could be a further layer overlying the low-velocity layer.

The static shift generated by a surface or near-surface low-velocity layer 5 depends on the thickness of the layer, and on the velocity of propagation of seismic energy through the layer. Lateral variations usually occur in both the thickness of a low-velocity layer 5 and the propagation velocity through the layer, so that the static shift observed at a seismic receiver at one location is likely to be different from the static shift observed at a receiver at another location. To a first approximation, the entire data set recorded at one receiver will be advanced or delayed by a static time shift relative to data recorded at another receiver.

SUMMARY OF THE INVENTION

It is highly desirable to take account of the static shift when processing seismic data. Unless these static shifts are removed from the seismic data, ambiguity will exist as to whether variations in arrival times of seismic events from deeper layers are due to variations in the depth or lateral locations of those deeper layers, or simply arise owing to propagation effects in the low-velocity layer 5.

The present invention provides a method of processing seismic data including corresponding first and second modes of seismic energy, the method comprising the step of processing the seismic data to obtain the travel time difference through the layer between seismic energy propagating in the first mode and seismic energy propagating in the second mode.

In a preferred embodiment, the second mode was generated by partial mode conversion of the first mode at a boundary face of a layer of the seabed.

It will be seen from FIG. 1 that the seismic energy passes through the low-velocity layer 5 twice, once as it travels from the seismic source 1 to the reflector 3, and again as it travels from the reflector 3 to the receiver 4. Both traverses of the low-velocity layer will cause static shifts; the shift caused as the downwardly propagating seismic energy passes through the low-velocity layer 5 is known as the source-side static shift, and the shift caused as the upwardly propagating energy passes through the low-velocity layer 5 is known as the receiver-side static shift. The present invention provides a method of estimating the receiver-side static shift.

The method of the invention may be used to process pre-existing seismic data Alternatively, it may be incorporated in a method of seismic surveying for processing the data as it is acquired or subsequently.

One embodiment of the present invention assumes that the contrast in physical properties between the basement 6 and the low-velocity layer 5 is sufficiently great that significant conversion between a p-mode of energy propagation and an s-mode of energy propagation, or vice-versa, takes place as seismic energy propagates upwards through the boundary between the basement 6 and the low-velocity layer 5. As a result of this mode conversion, for every p-mode event recorded by a seismic receiver above the boundary between the low-velocity layer and the basement there will be a corresponding s-mode event. The p-mode event and the corresponding s-mode event will occur at different times, because the p-mode and s-mode propagation velocities in the low-velocity layer are not equal to one-another. However, since the mode conversion occurs at the lower boundary of the low-velocity layer, the time delay between the p-mode event and the corresponding s-mode event must arise as the result of different velocities for the two modes in the low-velocity layer. The time delay between the p-mode event and the corresponding s-mode event will not be significantly influenced by the properties of the basement. The travel time difference between the p- and s-modes through the low-velocity layer can thus be readily determined by identifying a p-mode event and the corresponding s-mode event in the seismic data and determining the time delay between the p-mode event and the corresponding s-mode event.

Mode conversion may also occur when a downwardly propagating wave undergoes reflection at the interface between the low-velocity layer 5 and the basement 6. The invention may be applied to this case since, where mode conversion occurs on reflection, the reflected signal will contain a p-component and an s-component, and the two components will have different travel times through the low velocity layer 5.

Mode conversion may also occur when a downwardly propagating wave undergoes critical refraction at the interface between the low-velocity layer 5 and the basement 6, to generate a seismic wave propagating along the interface between the low velocity layer 5 and the basement 6. The wave propagating along the interface will excite both p-mode and s-mode waves in the low velocity layer, and the invention can be applied to these p- and s-modes.

For any parameter indicative of an aspect of the seismic data such as, for example, the pressure or a component of the particle motion (the term "particle motion" includes particle displacement, particle velocity, particle acceleration and higher derivatives of the particle displacement), events of one of the p- and s-modes will generally appear more strongly than will events of the other mode. According to preferred embodiments of the invention, therefore, two parameters indicative of two different aspects of the seismic data are used to locate a p-mode event and the corresponding s-mode event. In principle, if sufficiently strong mode conversion occurs at the lower boundary of the low-velocity layer, corresponding pairs of p-mode and s-mode events can be located by inspection of the received seismic data. In many cases, however, the amplitude of the mode-converted events is low, and a cross-correlation or de-convolution technique is then preferred.

The static shift for a p-wave is usually small compared to the static shift for an s-wave, since the p-wave velocity is greater than the s-wave velocity and hence the variation in travel time is smaller. Moreover, the less-consolidated sea bed sediments found in the low-velocity layer 5 tend not to cause lateral variations in the velocity of p-waves as significantly as they cause lateral variations in the velocity of s-waves. In many cases, the p-wave static shift is so small that it can safely be assumed to be negligible.

The present invention makes it possible to estimate the difference between s-wave static shift and the p-wave static shift at each receiver. If the p-wave static is known, can be estimated, or can be assumed to be zero, then the invention makes it possible to obtain the s-wave static.

A second aspect of the present invention provides a method of seismic surveying comprising the steps of: directing seismic energy propagating in a first mode towards a boundary face of a layer of the seabed such that partial mode conversion of the seismic energy into a second mode occurs at the boundary face; acquiring seismic data including the first and second modes of seismic energy at one or more receivers; and processing the seismic data according to a method as defined above.

A third aspect of the present invention provides an apparatus for processing seismic data including first and second modes of seismic energy, the apparatus comprising means for processing the seismic data to obtain the travel time difference through the layer between seismic energy propagating in the first mode and seismic energy propagating in the second mode.

In a preferred embodiment the apparatus comprises a programmable data processor.

A fourth aspect of the invention provides a storage medium containing a program for the data processor of an apparatus as defined above.

BRIEF DESCRIPTION OF THE DRAWINGS

Preferred embodiments of the present invention will now be described in detail by way of illustrative example with reference to the accompanying figures in which:

FIG. 4 shows a cross-correlogram for the traces of FIG. 3;

FIGS. 9(*a*) and 9(*b*) show the vertical and radial components of particle velocity obtained using the seismic surveying arrangement of FIG. 8;

FIGS. 10(*a*) and 10(*b*) show the vertical and radial components of particle velocity of FIGS. 9(*a*) and 9(*b*) after preliminary processing;

FIG. 12(*a*) is a schematic illustration of mode conversion of a down-going p-wave upon reflection at the boundary between a low-velocity layer and the basement;

FIG. 12(*b*) is a schematic illustration of mode conversion of a down-going s-wave upon reflection at the boundary between a low-velocity layer and the basement;

FIG. 13(*a*) is a schematic illustration of mode conversion of a p-wave propagating along the boundary between a low-velocity layer and the basement;

FIG. 13(*b*) is a schematic illustration of mode conversion of an s-wave propagating along the boundary between a low-velocity layer and the basement.

DETAILED DESCRIPTION OF SPECIFIC EMBODIMENTS

Figure 1:
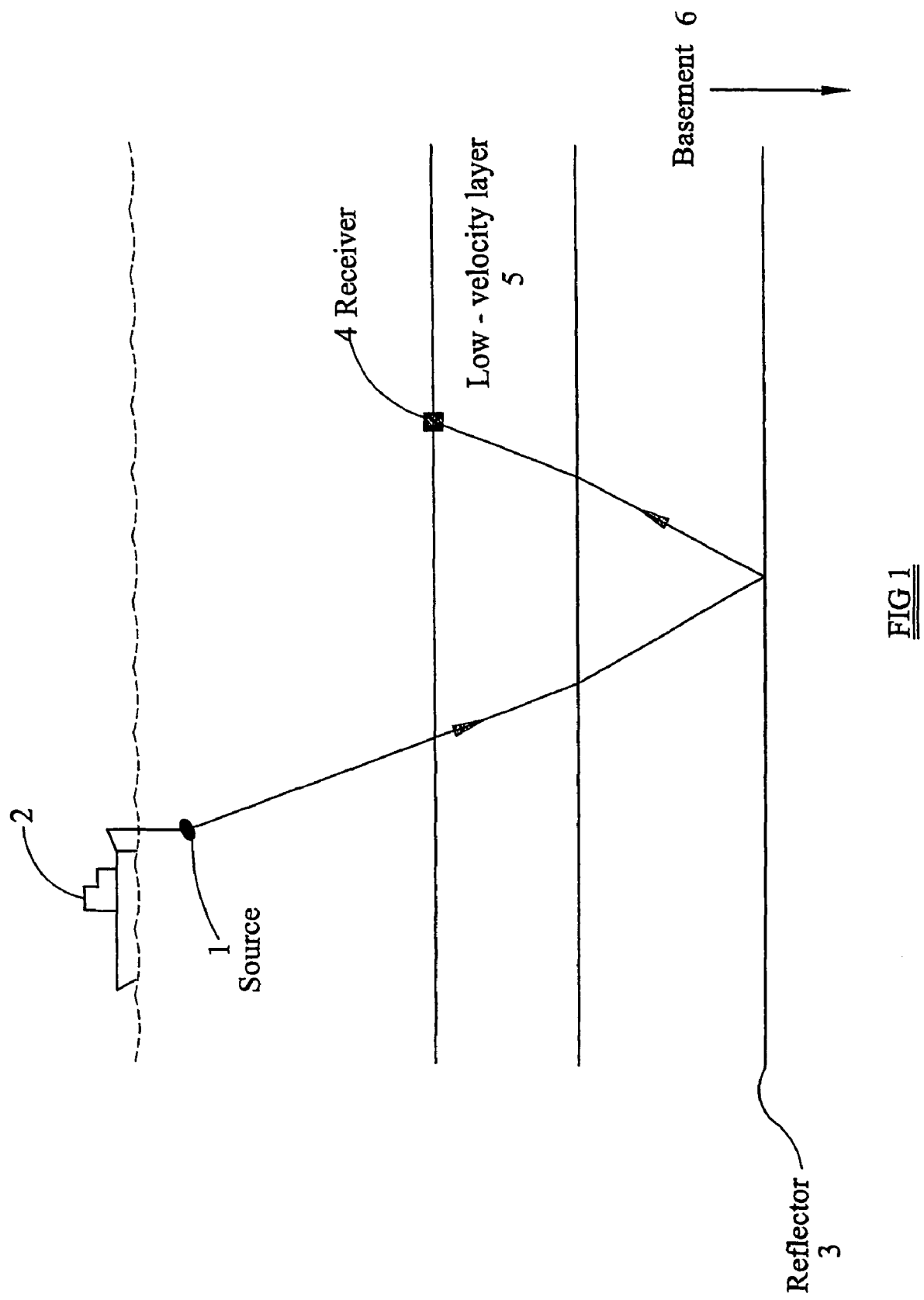
FIG. 1 is a schematic view of a marine seismic survey.
Figure 2:
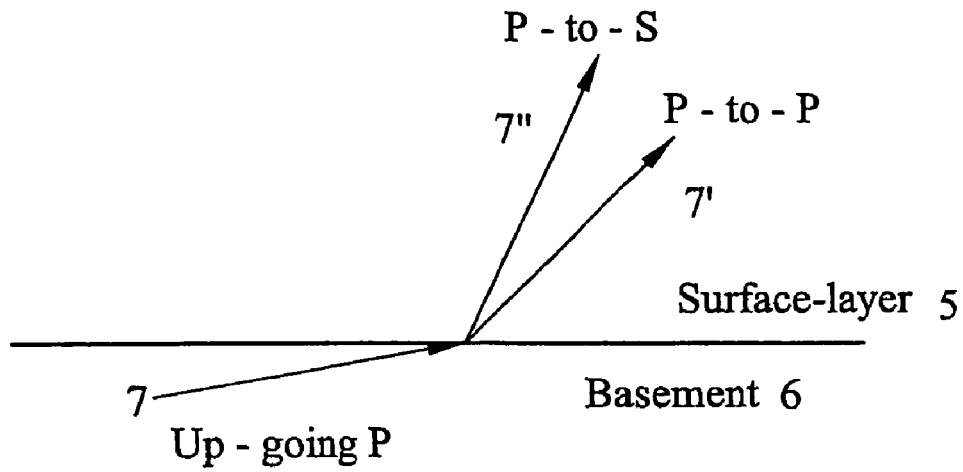
FIG. 2 is a schematic illustration of mode conversion of an up-going p-wave at the boundary between the basement and a low-velocity layer.

The principle of the invention will now be described with reference to an embodiment in which the pair of corresponding events are generated by partial mode conversion. FIG. 2 illustrates the occurrence of mode conversion as an upwardly propagating p-wave passes through the interface between the basement 6 and a low-velocity layer 5. The up-going p-wave 7 is partially transmitted as a p-wave 7', but also undergoes partial conversion to an s-wave 7". It is assumed that the upward-going p-wave was generated by a reflection from a deep interface between two layers of the earth's interior, or by refraction through deeper layers. Refraction will also occur at the interface between the basement 6 and the low-velocity layer 5, and the angle of refraction for the transmitted p-wave 7' will be different from the angle of refraction for the converted s-wave 7".

The transmitted p-wave 7' and the converted s-wave 7" will both produce a signal at the receiver array. The transmitted p-wave 7' and the converted s-wave 7" are, as indicated in FIG. 2, travelling in different directions and hence will arrive at different receiver positions, not at the same receiver. However, a similar converted s-wave from a neighbouring conversion point will arrive at the same receiver as the transmitted p-wave 7' shown in FIG. 2. It will be assumed that, for a transmitted p-wave and a converted s-wave received at a particular receiver, the difference between the conversion point (at the base of the low-velocity layer) of the converted s-wave and the point in the base of the low-velocity layer through which the p-wave was transmitted does not significantly affect estimates of the static shifts obtained by the method of the present invention.

The transmitted p-wave 7 will be recorded predominantly on the vertical component of seismic energy recorded at the receiver, while the converted s-wave 7" will be recorded predominantly on the radial component of the seismic energy recorded at the receiver 4. (The radial direction is the source-receiver direction projected onto the sea-bed, and this 5 direction will be defined to be the x-direction.) This is because in a practical seismic surveying arrangement waves that have propagated up from deep in the earth's interior tend to make an angle of 30° or less to the vertical for a typical structure of the earth's interior and a typical depth of the target reflector. The shear wave is recorded predominantly on the radial component because the particle motion for a shear wave is perpendicular to the direction of propagation, compared to the particle motion for a p-wave which is along the direction of propagation.

Figure 3:
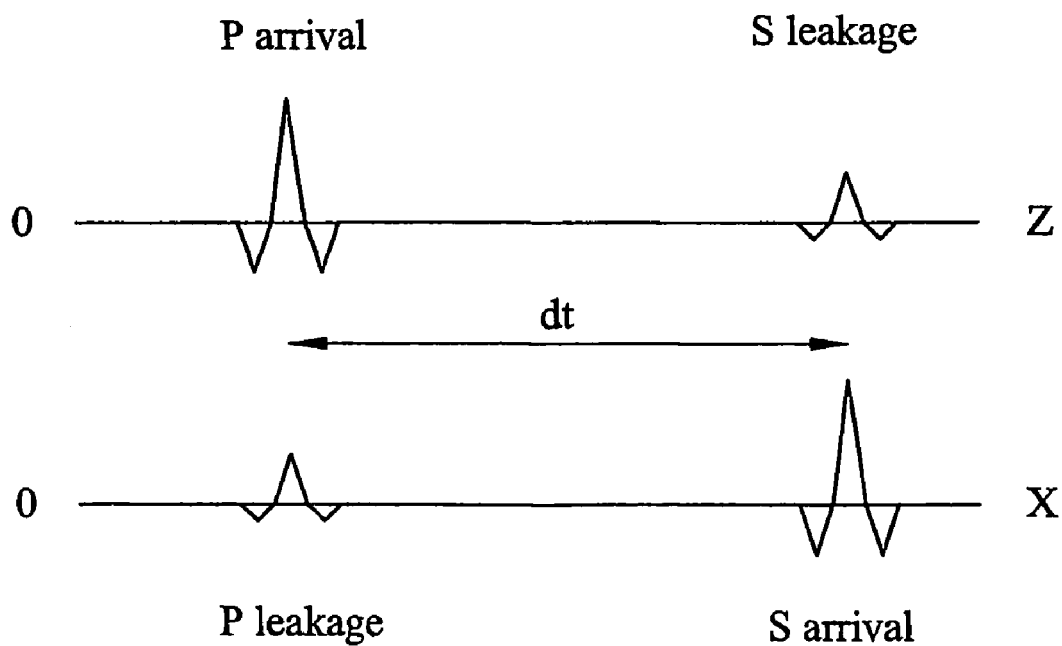
FIG. 3 shows schematic examples of seismic data traces for the situation of FIG. 2.

FIG. 3 is a schematic illustration of two parameters indicative of aspects of seismic data recorded at a receiver 4 where partial mode-conversion as shown in FIG. 2 occurs. The two parameters are the radial component (x-component) of the particle velocity measured at the receiver, and the vertical component (z-component) of the particle velocity measured at the receiver. Since the s-wave 7" was created as a conversion from the up-going p-wave 7, if the interface between the basement and the low-velocity layer is approximately planar locally, then the recorded s-wave will contain a similar wavelet to the p-arrival signal. The s-wave arrival will not occur at the same time as the p-wave arrival but will arrive after a time delay dt (compared to the p-wave arrival) caused by the difference between the velocity of p-waves and the velocity of s-waves in the low-velocity layer 5. This time delay dt is exactly the difference between the p-wave static shift and the s-wave static shift. Thus, if the p-wave static shift is known or can be estimated accurately, the s-wave static shift can be obtained simply by adding the time delay dt to the p-wave static shift.

In principle, the time delay dt can be obtained by any method of comparing the p-wave arrival time with the s-wave arrival time. In preferred embodiments of the invention, however, the time delay dt is determined by either deconvolving or cross-correlating a vertical component and a horizontal component of the seismic energy recorded at a seismic receiver.

FIG. 4 shows the cross-correlogram obtained by cross-correlating the horizontal and vertical components of the particle velocity shown in FIG. 3. It will be seen that there is a peak at zero time shift, which arises because the p-wave 7' arrival has a non-zero amplitude in the x-component of the measured particle velocity (although it occurs predominantly in the z-component of the measured particle velocity). Any s-wave energy that appears in the vertical component of the measured particle velocity will also cause a peak in the cross-correlogram at zero time shift.

The peak at time dt in the cross-correlogram occurs from the p-wave arrival peak in the vertical component of the measured particle velocity and the s-wave arrival peak in the x-component of the measured particle velocity. In order to distinguish this peak accurately from the peak at zero time shift, it is desirable (although not essential) that the peaks do not overlap. The peaks will not overlap if the wavelet in the recorded data is of sufficiently high frequency that the thickness of the low-velocity layer 5 is greater than two wavelet lengths. If it is not possible to be certain that the thickness of the low-velocity layer 5 is sufficiently thick to prevent the peaks overlapping, the accuracy of the determination of the time shift dt can be increased by deconvolving the x-component and the z-component of the measured particle velocity. Alternatively, the recorded wavefield can be completely decomposed into its p-wave component and its s-wave component using, for example, a technique such as disclosed in co-pending UK patent application No 0001355.7 or 0003406.6, by Robertsson et al in "Wavefield separation and estimation of near surface properties using densely deployed 3C single sensor groups in land surface seismic recordings", 70th Annual Society of Exploration Geophysicists (SEG) Meeting, Calgary (2000) or by Curtis et al in "Wavefield separation and estimation of near surface properties in land seismic", 62nd EAGE Conference Glasgow, Extended Abstracts (2000). Such decomposition techniques have the effect of removing the "leakage" peaks shown in FIG. 3 from the x-component and the z-component of the measured particle velocity. If the decomposed p-component and decomposed s-component of the recorded wavefield are then cross-correlated, the peak at zero time delay should not exist while the peak at the p-s delay time dt should be enhanced compared to that shown in FIG. 4.

If the seismic waves propagate predominantly in the radial direction (rather than reflecting back into the negative -radial direction, for example), then the cross-correlation or deconvolution of the vertical and radial components would be expected to give a positive peak at the p-s delay time dt, because the velocity of seismic energy increases generally downwards across the interface between the low-velocity layer 5 and the basement 6. Cross-correlation or deconvolution between the vertical and transverse components of the recorded seismic energy should detect wave propagation that is not in the radial-vertical plane, for example caused by near-surface scattering.

In a preferred embodiment, cross-correlograms obtained at a receiver for many different shots are averaged to increase the signal-to-noise ratio of the resultant cross-correlogram, known as a stacked cross-correlogram. This should increase the ratio between the amplitude of the time-shift peak on the vertical-radial cross-correlogram or deconvolution to the amplitude on the vertical-transverse cross-correlogram or deconvolution, if the interface between the low-velocity layer and the basement is approximately locally horizontal and the low-velocity layer is approximately azimuthally isotropic.

The invention is not limited to the use of deconvolution or cross-correlation techniques to obtain the travel time difference through the low velocity layer, and any suitable technique can be used. In principle, any algorithm that correlates two traces can be used. One example of another suitable technique is a bicoherence time delay estimation method, as described by L. Ikelle in "Geophysics", Vol 62, p1947 (1997), using the radial and vertical components of particle velocity (or, as will be discussed below, the pressure and the radial component of particle velocity).

Figure 11:
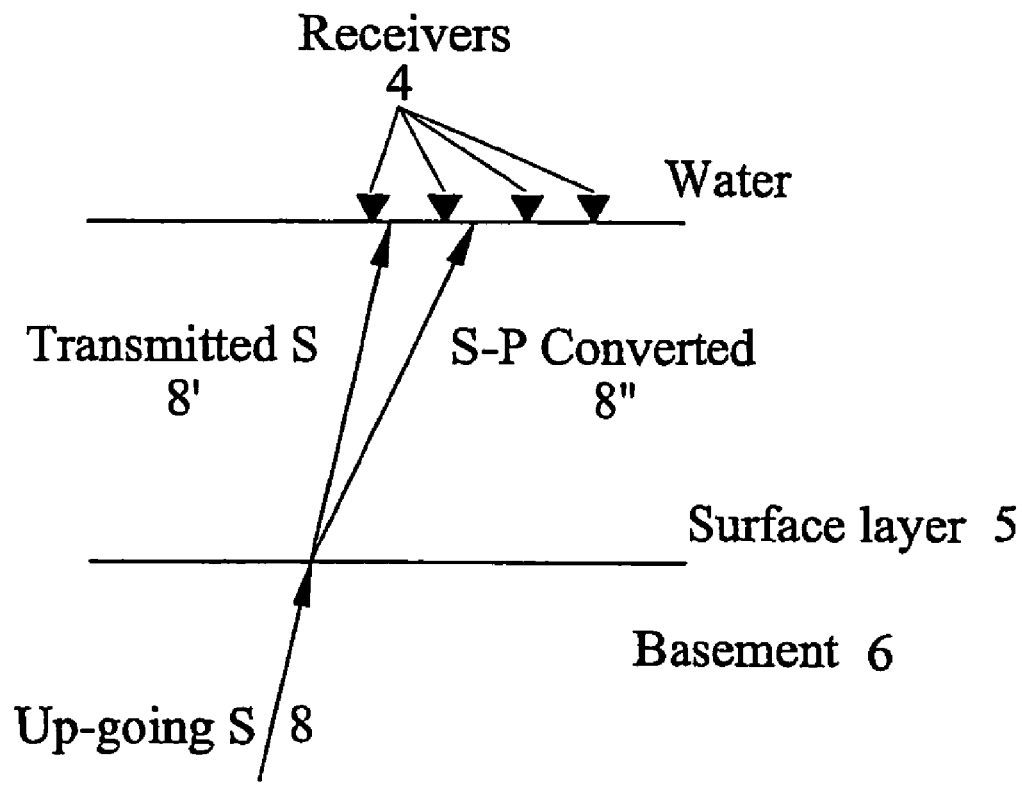
FIG. 11 is a schematic illustration of mode conversion of an up-going s-wave at the boundary between the basement and a low-velocity layer.

FIG. 2 illustrates mode conversion occurring for an up-going p-wave. A similar effect occurs if the up-going wave is an s-wave, as shown in FIG. 11. When an up-going s-wave 8 passes through the boundary between the basement 6 and the low-velocity layer 5, it will undergo partial transmission as an s-wave 8' and partial conversion to a p-wave 8". Both the converted p-wave 8" and the transmitted s-wave 8' will then propagate through the low-velocity layer 5 to the receivers 4. Hence, the only difference between this case and the case illustrated in FIG. 2 is that the amplitude of the s-wave arrival will now be greater than the amplitude of the p-wave arrival. The time delay between a p-wave arrival and the corresponding s-wave arrival will still be dt as in the example of FIGS. 2 and 3. Hence, a cross-correlation or deconvolution between the vertical and horizontal components of the seismic data should again exhibit a peak at the p-s time shift (that is, at the difference between the time for p-waves to travel through the low-velocity layer and the time for s-waves to travel through the low-velocity layer 5).

The up-going shear wave in general will refract towards the normal to the interface. However, considering the usual decrease in s-mode velocities on entering the low-velocity layer 5 from below, the s-p converted wave will generally refract away from the normal. This should be taken into account when selecting the offset range over which the deconvolution or cross-correlation techniques are applied.

One application of the invention is in extracting the difference between the p-wave static shift and the s-wave static shift from marine seismic data recorded using a receiver disposed on the sea-bed. In this case, the p-wave static shift is usually so small that it can be ignored, so that the p-s static shift extracted from the data by the method of the present invention is approximately equal to the s-wave static shift.

To illustrate the method of the invention, synthetic seismic data was generated for a simple 1-D model using a reflectivity model of the type disclosed by B. L. H. Kennett in "Seismic Wave Propagation In Stratified Media", Cambridge University Press, Cambridge, England (1983). Details of the model used are shown in table 1, and it can be seen that the model consists of a low-velocity layer having a thickness of 100 m, disposed between a layer of water and a basement layer. The water layer is assumed to have an infinite depth and the basement layer is also assumed to have an infinite depth. An explosive point source of seismic energy deeper in the earth (representing reflections from deeper layers) was used as the source of seismic energy, and this was located 200 m beneath the interface between the low-velocity layer and the basement layer. A linear array of receivers was disposed on the sea-bed

TABLE 1

| Layer | P-velocity [m/s] | S-velocity [m/s] | Density [kg/m³] | Thickness [m] |
|---|---|---|---|---|
| Water | 1500 | 0 | 1000 | Infinite |
| Low-Velocity | 1600 | 500 | 1400 | 100 |
| Basement | 2500 | 1500 | 1700 | Infinite |

Figure 5:
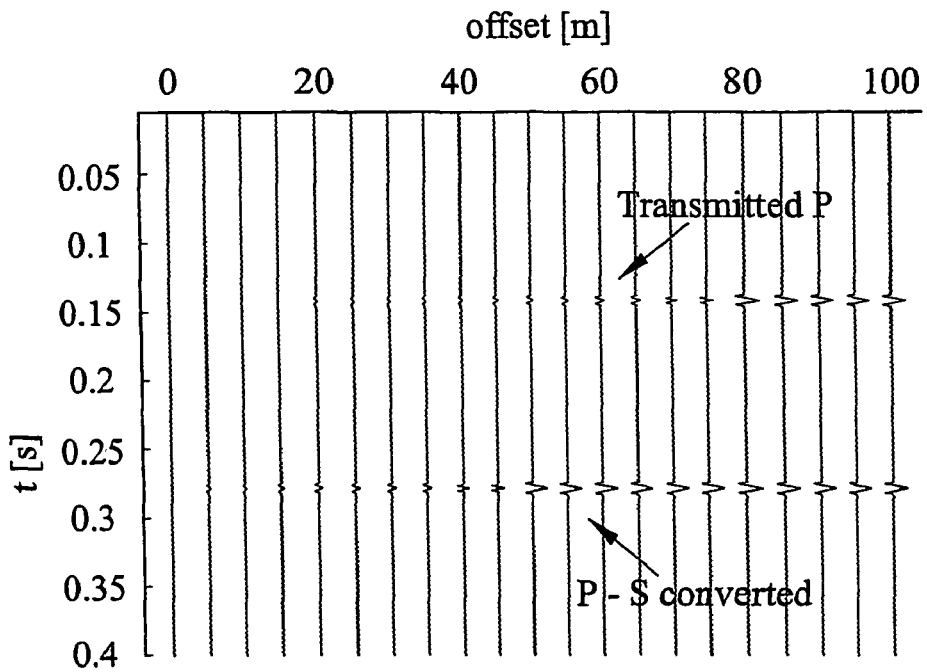
FIGS. 5(*a*) and 5(*b*) show synthetic seismic data generated for the model of Table 1.

Source depth: 200 m below low-velocity layer/basement interface
Source type: Explosive point source, generating p-waves only, 100 Hz Ricker wavelet
Receiver position: On the water/low-velocity layer interface, offset 0–100 m spacing 5 m The synthetic data obtained from this model is shown in FIGS. 5(a) and (b). FIG. 5(a) shows the vertical component of particle velocity, and FIG. 5(b) shows the radial component of particle velocity.

It is assumed in the model that the source generates p-waves. The signal recorded by the receivers contains a transmitted p-component, and an s-component produced by mode conversion occurring at the interface between the basement and the low-velocity layer. The arrival of the transmitted p-component is visible predominantly on the vertical component of the recorded seismic data, as shown in FIG. 5(a). On the radial component of the data, shown in FIG. 5(b), the transmitted p-wave energy and the arrival of the p-s converted wave are visible, particularly at increasing offset.

For a typical sea-bed seismic reflection survey, most of the transmitted p-energy will be recorded on the vertical component of the receiver. In general, the velocity of seismic energy sharply decreases on entering a low-velocity layer from below, so that the ray paths of the transmitted waves will be strongly refracted towards the vertical. In contrast, the s-wave generated by conversion at the interface between the basement and the low-velocity layer will appear predominantly on the radial component of the seismic energy recorded at the receiver.

It will be assumed that the interface between the basement 6 and the low-velocity layer 5 is horizontal, so that no $s_h$-mode wave is generated during the p-mode to s-mode conversion at the interface. The tangential component of the recorded data will be zero, and the converted s wave will be a pure $s_v$ wave. The theoretical displacement response for the low-velocity layer can then be written, following C. A. Langston in "*J Geophys Res.*" Vol. 84, pp 4749–47462 (1979), as:

$$D_V(t) = S(t) * E_v(t) \qquad (1)$$

$$D_R(t) = S(t) * E_R(t)$$

In equations (1) S(t) is the source time function of the incident p-wave, $D_V(t)$ and $D_R(t)$ are the vertical and radial components of the data, and $E_V(t)$ and $E_R(t)$ are the vertical and radial impulse responses, respectively. By deconvolving the vertical component of the recorded data from the radial component, the difference in travel time between the transmitted p-wave and the converted s-wave can accurately be extracted from the data. The fundamental ideal underlying this process is that the vertical component of the recorded data can be regarded as a good estimation of the source wavelet, because the impulse-response of the low-velocity layer 5 for the vertical component of the data, for an incoming planar p-wave, is close to a δ-function (Langston, supra). In other words:

$$E_V(t) \approx \delta(t) \text{ or } S(t) \approx D_V(t)$$

P-wave reverberations will also be on the vertical component but these are diminished in amplitude very much. The deconvolution result will therefore consist of the transfer function (called a receiver function in earthquake seismology) of the low-velocity layer layers for shear wave energy:

$$E_R(\varpi) = \frac{D_R(\varpi)}{S(\varpi)} \cong \frac{D_R(\varpi)}{D_V(\varpi)} \qquad (2)$$

The result in the time-domain can be interpreted much like a reflectivity series.

Because deconvolution basically is a division in the frequency domain, it can become unstable. Therefore, the denominator is preferably prevented from taking on too small values. This is achieved through filling of the spectral holes of the denominator to a fraction, c, of its maximum, a technique suggested by S. K. Dey-Sarkar and R. A. Wiggins in "*J. Geophys. Res*", Vol. 8 pp 3633–3641 (1976). Another problem that can arise is that noise can lead to high frequencies in the deconvolved result that are unphysical and not clearly present in the data. This can be prevented by multiplying the result in the frequency domain with a Gaussian function centred on zero and using the gaussian width parameter, a, to control its width (and thus the frequency content). The stable deconvolution in the frequency domain then is given by (Langston, supra):

$$E_R(\varpi) = \frac{D_R(\omega)D_V^*(\omega)}{\Phi_{SS}(\omega)} \cdot G(\omega) \quad (3)$$

where, $$\Phi_{SS}(\omega) = \max\{D_V(\omega)D_V^*, c.\max[D_V(\omega)D_V^*]\} \text{ and}$$
$$G(\omega) = e^{-\omega^2/4a^2}$$

Here $D_R(\omega)$ and $D_V(\omega)$ are the Fourier transforms of the radial and vertical component of the data respectively and the star denotes complex conjugate. $E_R(\omega)$ is the deconvolved radial earth response in the frequency domain and can be directly transformed back to the time domain to give the desired receiver function. $\Phi_{SS}(\omega)$ and $G(\omega)$ are the described stabilised denominator and Gaussian 'filter' respectively.

Figure 6:
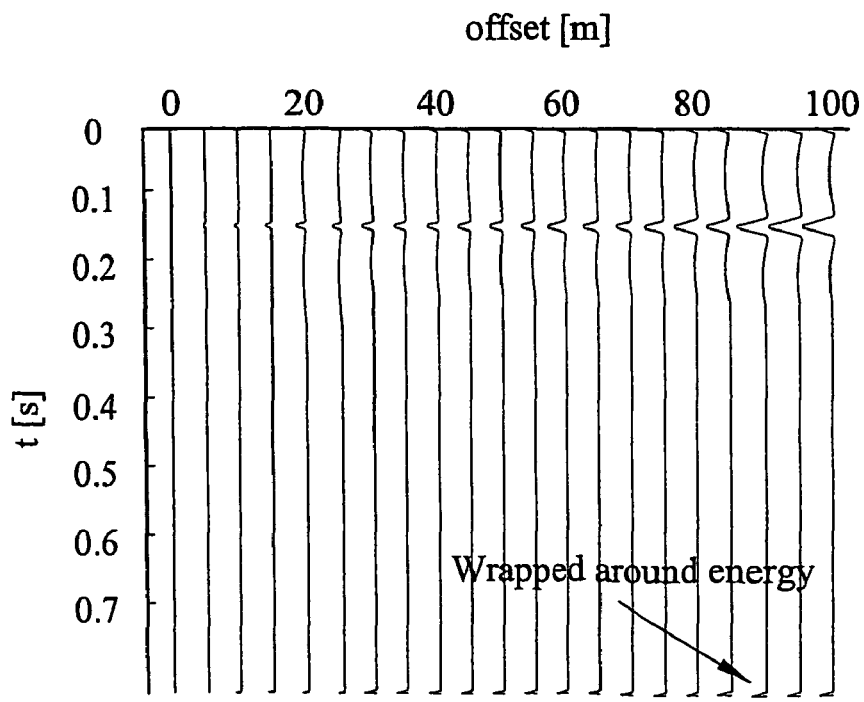
FIGS. 6(*a*) and 6(*b*) show the deconvolution of the data of FIGS. 5(*a*) and (*b*)

Due to non-vertical incidence, there will be some p-wave energy on the radial component of the data (FIG. 5(b)). This will also be present in the deconvolved result where it should be exactly at zero time. Because of the stabilisation of the deconvolution the width of the receiver function pulses becomes finite and therefore part of this will be wrapped around the end of the receiver function trace (FIG. 6(a)). In a preferred embodiment, this is prevented by padding zeros—at the length n of the trace—in front of the radial component and by padding the same amount of zeros behind the vertical component. The deconvolved trace (length 2n) then will have its zero time at sample n+1 and no arrival will be wrapped around (FIG. 6(b)).

Ideally the receiver function thus can be interpreted as the shear wave response of the low-velocity layer to an incident plane P-wave from below. The amplitudes of the receiver function therefore contain information on the low-velocity layer medium properties (i.e. velocity and density) and the low-velocity layer/basement velocity contrast. However, stabilising the deconvolution through filling of the spectral holes changes the amplitude of the receiver function. Following a suggestion made by C. J. Ammon in "*Bull. Seismol. Soc. Am.*" Vol 81 pp 2504–2510 (1991), the true amplitudes of the receiver function can be recovered. The effect of stabilising the deconvolution can be estimated by deconvolving the vertical component from itself (using the same values for parameters a and c), knowing the maximum amplitude of this deconvolved trace should consist of a single peak at zero time with amplitude one. Therefore, by dividing the receiver function by the maximum of this auto-deconvolution the true amplitudes are recovered.

Figure 7:
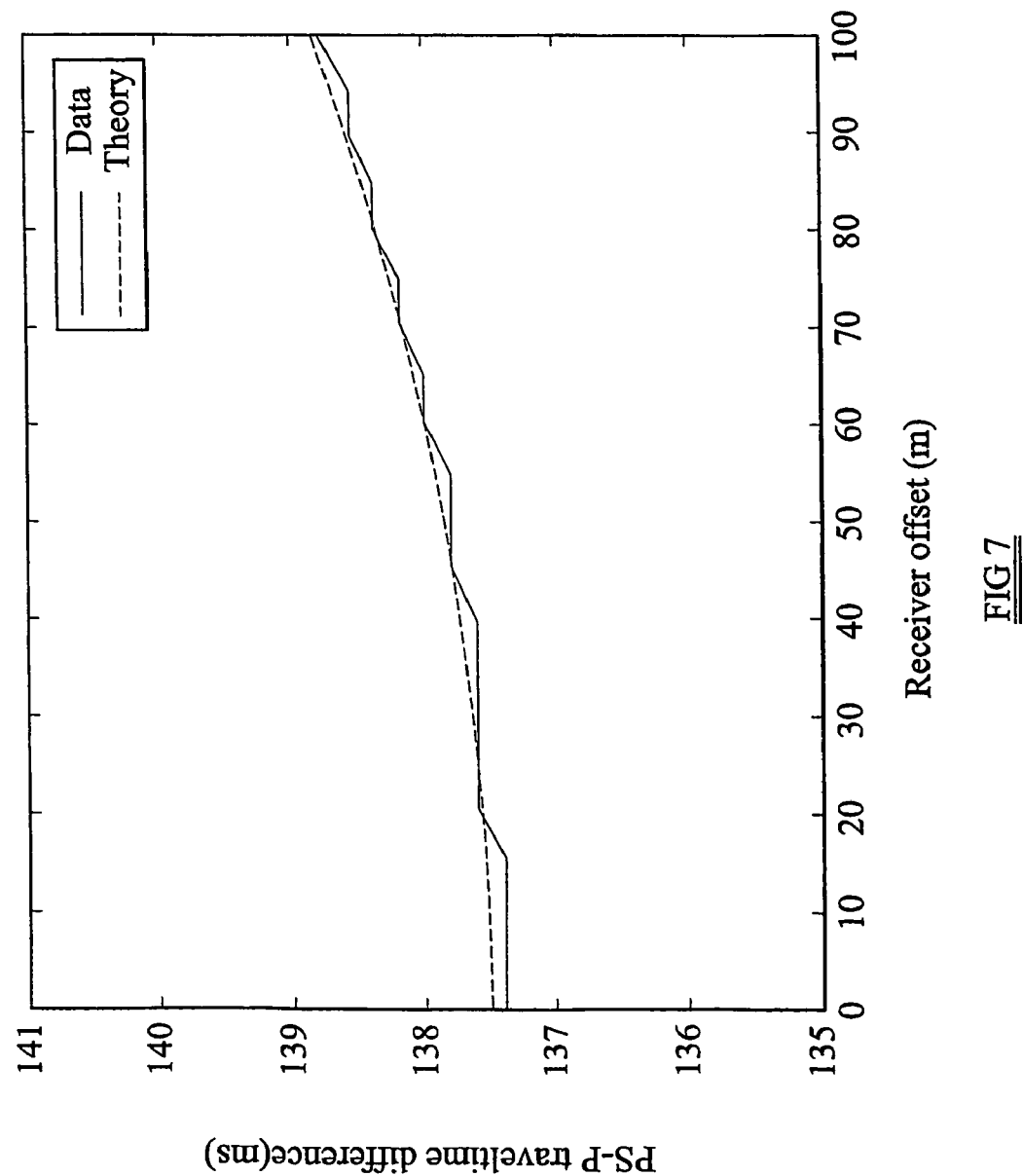
FIG. 7 shows theoretical and experimental results for the pp-ps travel time difference.

FIG. 7 is an illustration of the theoretical travel time difference between the transmitted p-wave and the converted p-wave calculated from the parameters of the model of Table 1, compared against the measured time difference as taken from the synthetic receiver traces of FIGS. 5(a) and (b). In FIG. 7, the theoretical travel time difference is shown as a broken line, and the measured time difference extracted from the synthetic data of FIGS. 5(a) and (b) is shown as a solid line. It will be noted that the solid line has a 0.2 ms stair step, and this arises because a sampling time interval of 0.2 ms was used in the generation of the synthetic seismic data. It will be seen that the time delay obtained by deconvolving the synthetic data of 5(a) and (b) agrees well with the theoretical travel time difference calculated from the model parameters.

In the model of table 1, the data is generated by a source located within the earth's interior, beneath the lower boundary of the low-velocity layer 5. However, the techniques described above with relation to the model of table 1 can be applied in exactly the same manner to data obtained using seismic energy that was emitted from a surface source and that has been refracted or reflected from layers deeper within the earth's interior so that it propagates upward through the part of the model of the earth's interior used in this method.

Using the vertical and the radial components of the particle velocity as the two parameters indicative of the seismic data, as described above, has the advantage that the p-mode events and s-mode events are separated naturally, with p-mode events appearing predominantly on the vertical component and shear wave events appearing predominantly on the radial component. However, the invention is not limited to the use of the vertical and the radial components of the particle velocity as the two parameters indicative of the seismic data.

In the deconvolution of the synthetic data of FIGS. 5(a) and 5(b), the deconvolution was performed for all offsets, using the full time length of the synthetic traces. This was possible because of the extreme simplicity of the earth model for which the synthetic data was calculated and the simple acquisition geometry (a transmission source-receiver setting, with the source being located in the basement region of the model). This simple straightforward approach cannot generally be used in practice, however. In a practical survey seismic data are acquired using more complicated acquisition geometries, and deconvolving the data for all offsets over the full time length of the traces would generally require considerable processing power. It is therefore preferable to perform the deconvolution or cross-correlation for a selected range of time and/or offset to reduce the processing required. It is also preferable to select the range of time and/or offset so as to reduce noise in the results of the deconvolution or cross-correlation.

As mentioned in the above explanation of the theoretical background of the deconvolution method, the deconvolved result is essentially the shear-wave impulse response of the low-velocity layer when a compressional wave is incident on it from below. Deconvolution and cross-correlation can therefore be seen as ways of determining a filter representing the low-velocity layer, with in this case a special interest in the phase-delay part of the filter. Put in this way, it will be clear that no down-going energy, such as water-layer reverberations and the direct wave from the source to the receiver, should be present in the selected data window. Moreover, no waves converted to shear energy in the basement should be present in the selected data (unless s-to-p conversion at the interface of the low-velocity layer is being used to find the difference between the p-static shift and the s-static shift, as will be discussed below with reference to FIG. 11). These types of seismic energy have not been filtered by the low-velocity layer in the way considered here and can therefore be regarded as noise for this method. The data used for the deconvolution/cross-correlation process is preferably selected to remove this energy as much as possible.

The time length of a window used to select data for the deconvolution/cross-correlation process is preferably short, to minimize the processing required. Although several consecutive up-going reflected p-wave events could in theory be filtered (i.e. partially converted to shear waves) by the low-velocity layer in exactly the same manner, it has long been established in the field of spectral estimation that taking longer data windows, although the filter relationship between both components is the same, does not reduce the variance of the result. In addition longer time-length windows potentially contain more unwanted arrivals, leading to additional noise in the results of the cross-correlation or deconvolution process. The time window for selecting the radial component of the data should be chosen to cover the shear wave arrival that has a time delay corresponding to the maximum expected time delay.

In selecting a part of the data for deconvolution/cross-correlation it is also preferable to select data for offset. Zero-offset data for a plane layered medium will not contain any shear-wave energy arising from s-wave to p-wave conversion at the boundary of the low-velocity layer, since no conversion will take place for vertically incident compressional waves. On the other hand, data with a long offset (that is, data where the offset is substantially greater than the reflector depth) will not satisfy the surface-consistent statics assumption and the static corrections will become dynamic corrections. It is therefore preferable to exclude zero-offset data and long-offset data from the data used for deconvolution/cross-correlation.

For a survey site where there is pre-existing knowledge of the structure of the low-velocity layer and the basement, it may be possible to calculate an offset range in which the maximum p-s conversion is expected to occur. If so, the offset range selected for deconvolution/cross-correlation should include the offset range where maximum p-s conversion is expected to occur.

In another embodiment, (scaled) pressure recordings are used instead of the vertical component of particle velocity. It has been observed by X. Li et al, in "Lomond Data Analysis: Geophone Coupling and Converted-Wave Imaging, Research Report Edinburgh Anisotropy Project" (*Applied Seismic Anisotropy*), Vol. 7, Converted waves II: Case examples, pp. 185–212 (1999/2000), that leakage of small amounts (<5%) of shear wave energy from the radial component of particle velocity to the vertical component of particle velocity can occur owing to unwanted cross-coupling between the two components of particle velocity using seabed acquisition cables. This unwanted cross-coupling can be accompanied by a small phase shift of the order of 6 ms, and therefore will appear in the deconvolution and cross-correlation results as a static event with a 'traveltime difference' of order 6 ms. No such coupling effects exist between pressure and the radial component of particle velocity and therefore receiver functions calculated by deconvolving or cross-correlating pressure from the radial component of particle velocity do not suffer this phase shift. However because of the scalar nature of a pressure recording, the zero-time or projection part in the deconvolution or cross-correlation results will be more significant.

In the embodiments described above the time shift dt has been determined by deconvolving or cross-correlating parameters indicative of the measured seismic data. Such techniques are advantageous where the mode-converted events have a low amplitude. If the contrasts in properties between the low-velocity layer 5 and the basement 6 are more than sufficiently strong for the method of the invention to work, the p-s converted events can have such high amplitudes that it may not be necessary to perform deconvolution or cross-correlation (i.e. to explicitly calculate receiver functions) from which the traveltime differences may be estimated. Instead, the p-s converted phase may be observed directly in the seismic data.

Figure 8:
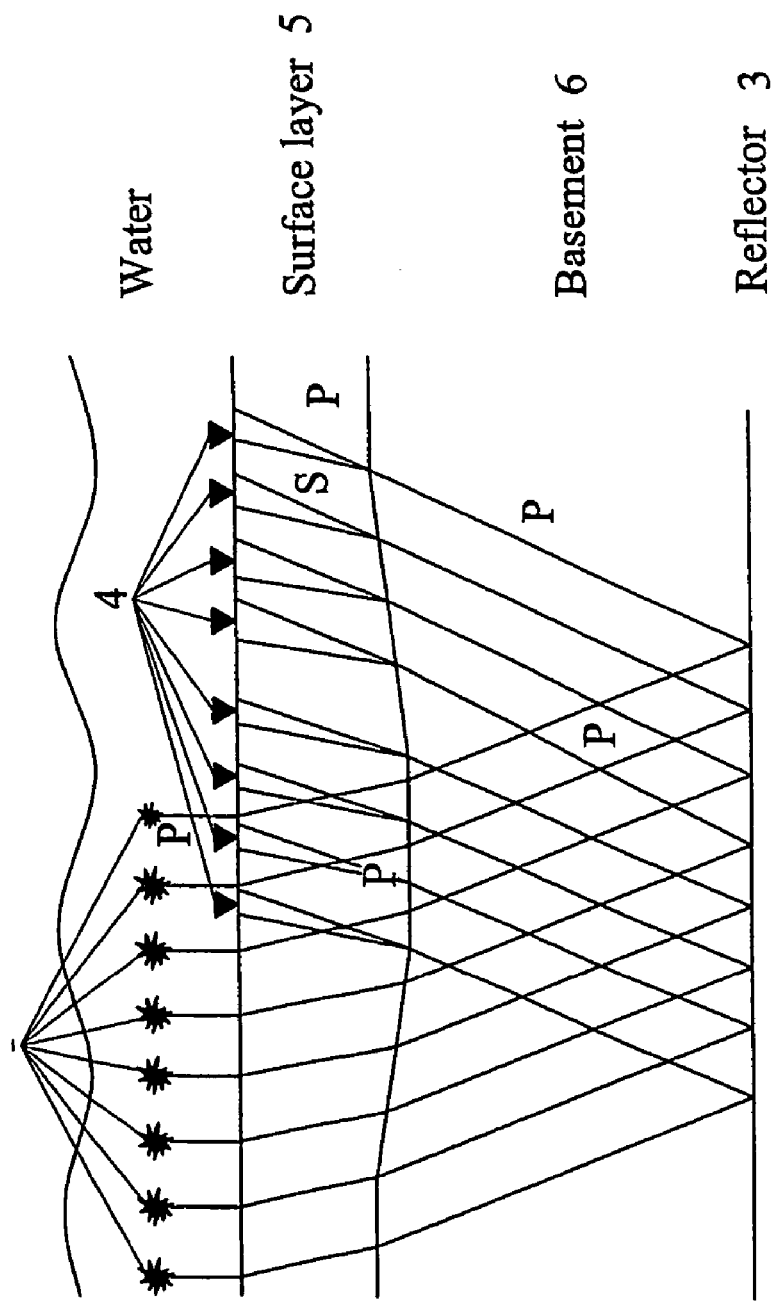
FIG. 8 is a schematic illustration of a seismic surveying arrangement having common-offset source and receiver geometry.

FIG. 8 illustrates a seismic surveying arrangement in which data is acquired by source-receiver pairs which all have the same offset—the offset is equal in both magnitude and sign for every source-receiver pair. This is known as Common (signed) Offset Profile acquisition geometry. The sources emit p-mode seismic energy, which is reflected by the reflector 3 back to the receivers 4. Mode conversion occurs when the reflected p-wave passes through upwards through the interface between the basement 6 and the low-velocity layer 5, so that the seismic energy received at the receivers contains both p-modes and s-modes. The offset of the source receiver pairs is chosen to correspond to the range in which the maximum p-s conversion is expected to occur (the offset is not zero-offset and is not too great).

FIGS. 9(*a*) and 9(*b*) show respectively the vertical component and the radial component of the particle velocity measured by the receivers 4 in the surveying arrangement of FIG. 8. It will be seen that the reflected p-event appears predominantly in the vertical component of the particle velocity, whereas the converted s-event appears predominantly in the radial component of the particle velocity. Some slight leakage occurs, so there are weak events corresponding to the reflected p-event in the radial component of the particle velocity and weak events corresponding to the converted s-event in the vertical component.

The p-s converted events in the radial component of the particle velocity have sufficient amplitude to be directly visible. Thus, by inspecting the radial component of the particle velocity at sample times shortly after (0–100 ms after) a strong p-event has been recorded in the vertical component, the corresponding p-s converted event may be observed directly. To extract the travel time difference between the p-wave and the corresponding converted s-wave, the p-event can be tracked across the traces produced by different receivers. Its arrival time can be used as a zero-time reference to define the start of a time-window within which the corresponding s-event is expected to appear in the radial component. The length of the time window corresponds to the maximum expected shear static. Once the corresponding s-event has been located within the time window, the travel time difference between the p-event and the s-event can then be read directly from the data. Alternatively, the s-event can again be tracked across the traces.

The p-event is not "flat" in the traces shown in FIGS. 9(*a*) and 9(*b*), since it does not occur at the same time in every trace. FIGS. 10(*a*) and 10(*b*) show the data of FIGS. 9(*a*) and 9(*b*) after they have undergone preliminary processing to make the p-event "flat".

The embodiments of the invention described above relate to mode conversion occurring when an upwardly propagating wavefield undergoes partial mode conversion upon transmission through the interface between the basement 6 and the low-velocity layer 5. It is, however, possible for mode conversion to occur when a downwardly propagating wave undergoes reflection at the interface between the low-velocity layer 5 and the basement 6. This is illustrated schematically in FIGS. 12(*a*) and 12(*b*).

In FIG. 12(*a*), a p-wave 7 propagates downwardly through the low-velocity layer 5 and is reflected at the interface between the low-velocity layer 5 and the basement 6. Partial mode conversion occurs upon reflection so that, in addition to the up-going reflected p-wave 7', there also exists an up-going mode-converted s-wave 7". The techniques described above for determining the difference between the p-wave static shift and the s-wave static shift can be applied equally to the survey arrangement shown in FIG. 12(a). The method can be applied in exactly the same way as it is applied to the upgoing transmitted (and partially converted) wavefield except that data recorded at shorter offsets have to be used when the reflections of a downgoing source wavefield are considered. This is because the wavefield reflected by a deep reflector in the model used in the transmissive arrangements will be propagating closer to the vertical at a given offset, compared to waves reflected at interface between the low-velocity layer 5 and the basement arriving at the same offset.

FIG. 12(b) generally corresponds to FIG. 12(a), but illustrates partial mode conversion occurring on reflection of a downgoing s-wavefield 8 to give an upgoing s-wavefield 8' and a upgoing mode converted p-wavefield 8".

FIGS. 13(a) and 13(b) illustrate further embodiments of the invention. In these embodiments mode-conversion is induced by a wave field that propagates downwardly through the low velocity 5 and undergoes critical refraction at the interface between the low velocity layer 5 and the basement 6.

FIG. 13(a) shows a p-wave 9 propagating downwards through the low velocity layer 5. The angle $\theta_i$ denotes the incident angle—that is, the angle between the direction of propagation of the wave and the normal to the interface (or, in the case of a non-planar interface, the instantaneous normal to the interface). When the p-wave 9 is incident on the interface between the low velocity layer 5 and the basement, one would ordinarily expect that the p-wave 9 would be partially transmitted into the basement 6, as shown by the broken line 9' and partially reflected at the interface. The angle $\theta_r$ between the transmitted wave 9' and the normal to the interface is related to the incident angle $\theta_i$ by Snell's Law. The velocity of seismic energy in the basement 6 will generally be greater than the velocity of seismic energy in the low velocity layer 5, however, so that if the angle of incidence exceeds a certain critical angle then Snell's law will predict a value for sin $\theta_r$ that is greater than 1. When this happens a refracted wave 9" will propagate along the interface between the low velocity layer 5 and the basement 6. This phenomenon is known as "critical refraction", and is similar to the phenomenon of total internal reflection in optics. The critically refracted wave can excite upwardly propagating waves, known as "head waves", in the low velocity layer, and these are recorded at the receivers 4. Such head waves are found in seismic data whenever the source-receiver offset is sufficiently great that the incident angle $\theta_i$ on the relevant interface exceeds the critical angle for the onset of critical refraction. In the case of the interface between the low velocity layer 5 and the basement 6 the critical offset is low, and head waves are recorded for most receiver locations and for most shot points.

As an example, consider a low velocity layer 5 consisting of a material with p-wave propagation velocity $\alpha_1$ and an s-wave propagation velocity $\beta_1$ overlying a basement 6 with a p-wave propagation velocity $\alpha_2$ and an s-wave propagation velocity $\beta_2$, where the following relations are satisfied:

$\alpha_1 < \alpha_2$ $\beta_1 < \beta_2$; and $\beta_2 < \alpha_1$

FIG. 13(a) illustrates the case where the incident angle $\theta_i$ satisfies the relationship sin $\theta_i = \alpha_1/\alpha_2$. This incident angle is a first critical angle, and will be referred to as $\theta_{c\alpha\alpha}$.

When the incident angle of the down-going p-wave 9 satisfies $\theta_i = \theta_{c\alpha\alpha}$, sin $\theta_r$ takes the value of 1, meaning that $\theta_r$ is 90°. The transmitted wave 9' propagating into the basement 6 will therefore not exist, and instead there will be a critically refracted p-wave 9" that propagates along the interface between the low velocity layer 5 and the basement 6. As this refracted p-wave propagates along the interface it will excite p-waves 10 within the low velocity layer 5, and these p-waves 10 will give rise to s-waves 11 as a result of mode conversion at the interface between the low velocity layer 5 and the basement 6. Two pairs of the p-wave 10 and the mode-converted s-wave 11 are shown in FIG. 13(a), although the excitation of the p- and s-waves 10, 11 will occur at all points along the path of the refracted wave 9". The excited p-wave 10 will propagate at an angle of $\theta_{c\alpha\alpha}$ to the normal to the interface, whereas the mode-converted s-wave 11 will propagate at an angle $\theta_{c\beta\alpha}$ to the normal, where sin $(\theta_{c\beta\alpha}) = \beta_1/\alpha_2$. The critically refracted p-wave occurs for all incident angles equal to or greater than $\theta_{c\alpha\alpha}$.

FIG. 13(b) corresponds generally to FIG. 13(a), but illustrates the critical refraction of an s-wave 12 propagating downwardly through the low velocity layer 5. If the angle of incidence $\theta_i$ is equal to or greater than a second critical angle $\theta_{c\beta\alpha}$, then the downgoing s-wave 12 will partially convert to a critically refracted p-wave 12" which propagates along the interface between the low velocity layer 5 and the basement 6. The critically refracted p-wave again excites p-waves 13 and mode-converted s waves 14 that propagate upwardly through the low velocity layer 5.

In the cases illustrated in 13(a) and 13(b), the critically refracted p-wave 9", 12" emits both p-wave energy and s-wave energy upwards into the low velocity layer 5. Detection of both the p-wave and s-wave energy at the receivers 4 again yields the difference between the static shift of p-waves and the static shift of s-waves. The s-wave 11 is formed by mode-conversion at the interface between the low velocity layer 5 and the basement 6, so that the travel time difference through the low velocity layer between a p-wave 10 excited at one point on the interface and the corresponding mode-converted s-wave 11 will be equal to the difference between the p-mode static shift and the s-mode static shift. Thus, the time difference between the arrival time of the p-wave 10 (the p-arrival) and the arrival time of the s-wave 11 (the s-wave arrival) at the receivers 4 is equal to the difference between the static shift for the p-wave and the static shift for the s-wave. Thus, by detecting the time delay between a p-arrival and the corresponding s-arrival, it is possible to determine the difference between the p- and s-static shifts. The time delay can be determined using any of the methods described above, for example, by deconvolution or cross-correlation of the vertical and radial components of the measured particle velocity, or by deconvolution or cross-correlation of the measured pressure and the radial component of the particle velocity. It should be noted that there exists a third critical angle, $\theta_{c\beta\beta}$, where sin $\theta_{c\beta\beta} = \beta_1/\beta_2$. When a down-going s-wave is incident on the interface between the low velocity layer 5 and the basement 6 at an angle equal or greater to the third critical angle $\theta_{c\beta\beta}$, a critically refracted s-wave will be generated, which propagates along the interface between the low velocity layer 5 and the basement 6. However, this critically refracted s-wave will not produce an upwardly propagating p-wave in the low velocity layer 5.

In the examples of FIGS. 13(a) and 13(b) it has been assumed that both the p-wave velocity and the s-wave velocity increase downwards across the interface between the low velocity layer and the basement. It is sometimes found that not all velocities increase downwards across the interface, and this leads to situations that are more complicated than those shown in FIG. 13(a) and 13(b). However, whenever critical refraction occurs at the interface between the low velocity layer 5 and the basement 6, leading to excitation of both p-waves and mode-converted s-waves into the low velocity layer 5, it is possible to apply the method of the present invention. The seismic energy acquired at the receivers 4 can be analysed by any method described above to extract the travel time difference for the emitted p-wave energy and the s-wave energy, and thus obtain the difference between the p-wave static shift and the s-wave static shift.

In the above examples of the invention, the travel time difference for p-modes and s-modes through the low-velocity layer is obtained from two components of the particle velocity, or from a component of the particle velocity and the pressure. In alternative embodiments of the invention, the measured particle displacement is used rather than the particle velocity. Thus, in an alternative embodiment the travel time difference for p-modes and s-modes through the low-velocity layer is obtained from two components of the particle displacement, for example by cross-correlating or deconvolving the vertical and radial components of the particle displacement. In a further embodiment, the travel time difference for p-modes and s-modes through the low-velocity layer is obtained from a component of the particle displacement and the pressure, for example by cross-correlating or deconvolving a component of the particle displacement and the pressure. These embodiments correspond generally to the embodiments described above with regard to using the particle velocity to obtaining the travel time difference, and will not be described further.

In further embodiments of the invention the particle acceleration is used rather than the particle velocity. Thus, in these embodiments the travel time difference for p-modes and s-modes through the low-velocity layer is obtained from two components of the particle acceleration, or from a component of the particle acceleration and the pressure. This can be done by, for example, cross-correlating or deconvolving the vertical and radial components of the particle acceleration or by cross-correlating or deconvolving a component of the particle acceleration and the pressure. These embodiments correspond generally to the embodiments described above with regard to using the particle velocity to obtaining the travel time difference, and will not be described further. In principle, higher derivatives of the particle displacement could be used, so that the travel time difference for p-modes and s-modes through the low-velocity layer could be obtained from two components of a higher derivative of the particle displacement, or from a component of a higher derivative of the particle displacement and the pressure.

In the embodiments described above the receiver(s) 4 has/have been disposed on the sea-bed. In principle, however, the invention is not limited to this, and the receiver(s) could be located anywhere in the path of seismic energy after partial mode conversion has occurred. Thus, in the embodiments described above the receiver(s) could in principle be located anywhere above the interface between the low-velocity layer and the basement. For example, the receiver(s) could be buried within the sea-bed in a 4-D time-lapse seismic survey. It should be noted however that additional processing will be required to determine the difference between the static shifts of the two modes if the receiver is not located on the sea-bed.

In the above description of embodiments of the invention the x-direction has been defined to be the radial direction, namely the projection of the source-receiver direction onto the sea-bed. A seismic receiver will record the components of particle velocity or particle displacement in two orthogonal horizontal directions, and these directions may be referred to as the receiver's x- and y-axes. It should be noted that the receiver may not be deployed with its x-axis aligned with the radial direction, so that an additional projection or rotation of the "raw" horizontal components measured by the receiver may be required in order to calculate the radial and transverse components from the receiver's output. The raw x- and z- components measured at the receiver can in principle be used to estimate the travel time difference for p-modes and s-modes through the low-velocity layer, by any of the methods described above, and this would give acceptable results if the angle between the receiver's x-axis and the radial direction is not too large.

A processing method of the present invention may be applied to the processing of pre-existing seismic data. The invention may also be incorporated into a method of seismic surveying in which the acquired seismic data includes mode-converted events arising from partial mode conversion at the interface between a low velocity layer and the basement. Such seismic data can be obtained by directing seismic energy towards the interface such that partial mode conversion occurs when seismic energy is transmitted through, or reflected by, the interface.

As noted above, the present invention can be applied to upwardly propagating s-waves that undergo partial mode conversion to p-waves at the interface between the basement and the low velocity layer, as well as to upwardly propagating p-waves that undergo partial mode conversion to s-waves at the interface. Both these cases can be used to find the travel time difference for s-waves and p-waves through the low velocity layer. In principle, the travel time difference between p-waves and s-waves through the low velocity layer would depend on the slowness of the incident wave, even for an ideal situation in which the seabed and the interface between the low velocity layer and the basement are both flat. In practice, however, for the range of source-receiver offsets that are used in typical seismic surveys, and for typical materials of the low velocity layer, it is found that the dependence of the travel time difference on the slowness of the incident wave is very weak, and that the travel time difference is effectively constant regardless of the slowness of the incident wave. It has been found that a typical variation is only a few milliseconds across the complete receiver range.

It is therefore safe to assume that the travel time difference through the low velocity layer is independent of the slowness of the incident wave. This assumption is equivalent to the surface-consistent static assumption, which is generally considered to be valid in most static problems. Making this assumption means that the wave field recorded at the receivers 4 does not need to be filtered or separated even though it is a mixture of waves arriving with different slownesses from different reflectors within the earth, and also is a mixture of both p-waves and s-waves,. Furthermore, it is not necessary to extract single events from the data in order to apply the method of the invention. This means that relatively long time windows (of the order of seconds) can be used in the deconvolution or cross-correlation process. Furthermore, traces can be stacked in the common receiver domain to improve the signal-to-noise ratio of the data.

It has been noted above that the receiver may not be deployed with its x-axis aligned with the radial direction, in which case the "raw" horizontal components measured by the receiver may need to be projected or rotated in order to calculated the radial and transverse components from the receiver's output. It should be noted that this procedure is not necessary where the seismic forces are arranged in a shotline, and are actuated when the shot line is disposed directly over, parallel to, the receiver line. In this case, the x-component of the raw receiver data can be regarded as the radial component and the y component of the raw receiver data can be considered to be the trasverse component. It should be noted, however, that the sign of the data changes for events on the radial component of the seismic data when the offset changes from negative to positive (the one-dimensional earth assumption). This must be taken into account when stacking deconvolution or cross correlation results from a common receiver gather that includes both positive and negative offsets, since neglecting this can lead to attenuation and possibly even complete loss of the signal. It is necessary to reverse the sign of data acquired for one offset before stacking the data The invention has been described above with reference to cross-correlation, deconvolution and bicoherence as examples of methods for correlating two seismic data traces. The invention is not limited to these methods, however, and any suitable technique or algorithm for correlating two traces may be used.

The invention may also be applied to p- and s-wave "reverberation events". In such events partial mode conversion, for example upon transmission through or reflection at the interface between the near surface 5 and the basement 6. In a reverberation event, however, the p- and s-waves do not pass directly from the point at which the mode-conversion occurs to the receiver. In a reverberation event the p- and s-waves undergo one or more reflection at a boundary of the near-surface and so make multiple passes through the near-surface 5 before being incident on the receiver.

Seismic data may also contains events that arise from partial mode conversion that occurs not at a boundary of the near-surface but within the near-surface. This may arise owing to, for example, layering effects in the near-surface.

In the embodiments described above one of the p- and s-wave events has been generated by partial mode conversion. However, as noted above, the invention is not limited to this and may be applied to any pair of corresponding p- and s-events for which differences in amplitude and/or waveform of the two events arise primarily from the near-surface 5. For example, in a seismic survey that uses a source that emits both p- and s-waves, the acquired data will contain an event arising from reflection of p-waves at a particular point on the lower boundary of the near-surface 5 and will also contain a corresponding event arising from reflection of s-waves at that point on the lower boundary of the near-surface 5. The invention may be applied to these events. (It should be noted that, since a water column will not support s-wave propagation, a source emitting both s- and p-modes would need to be disposed on the seabed, on the earth's surface or in a borehole.

Figure 14:
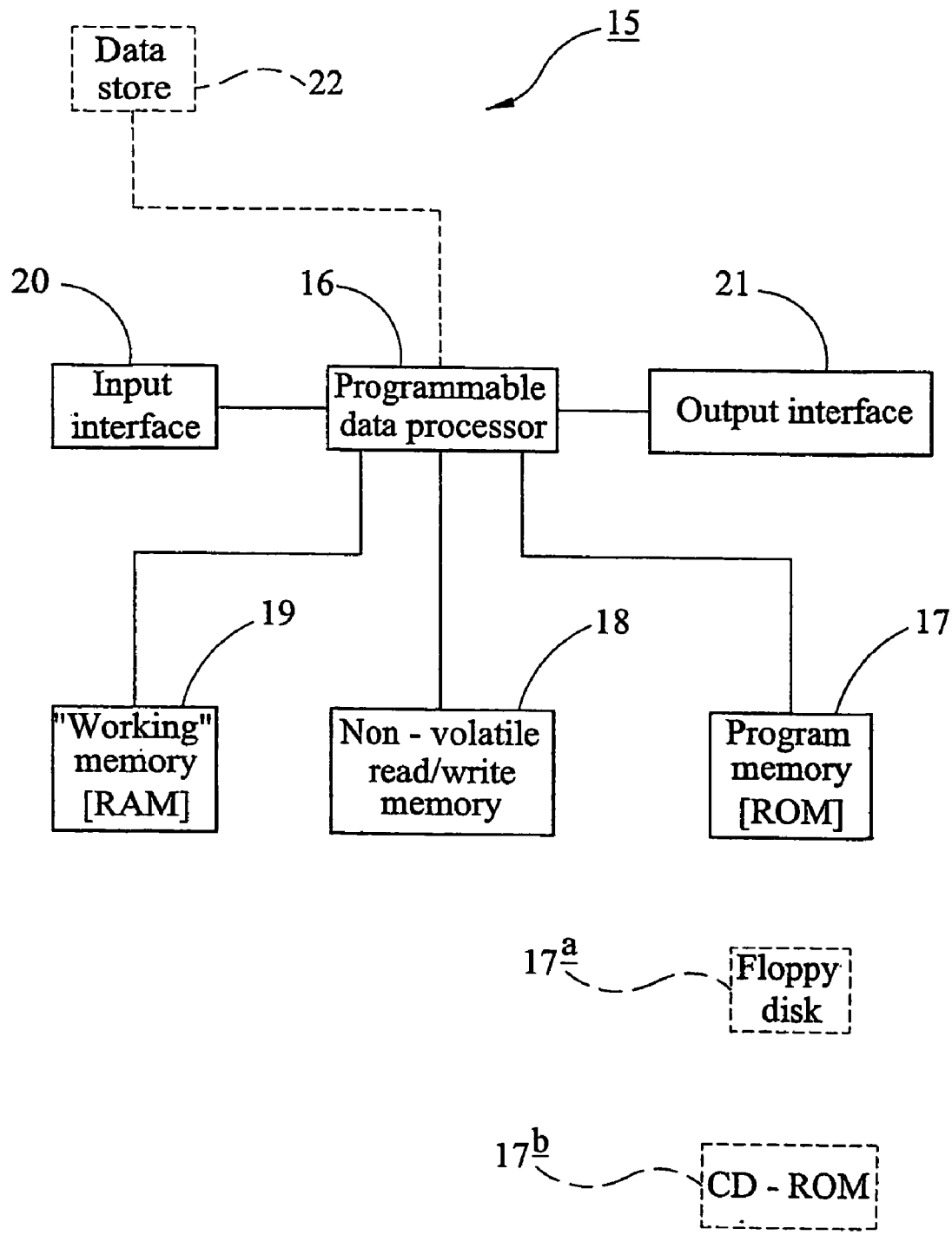
FIG. 14 is a schematic block diagram of an apparatus according to the present invention.

FIG. 14 is a schematic block diagram of a programmable apparatus 15 according to the present invention. The apparatus comprises a programmable data processor 16 with a program memory 17, for instance in the form of a read only memory ROM, storing a program for controlling the data processor 16 to perform any of the processing methods described above. The apparatus further comprises non-volatile read/write memory 18 for storing, for example, any data which must be retained in the absence of power supply. A "working" or "scratchpad" memory for the data processor is provided by a random access memory (RAM) 19. An input interface 20 is provided, for instance for receiving commands and data. An output interface 21 is provided, for instance for displaying information relating to the progress and result of the method. Seismic data for processing may be supplied via the input interface 20, or may alternatively be retrieved from a machine-readable data store 22.

The program for operating the system and for performing the method described hereinbefore is stored in the program memory 17, which may be embodied as a semiconductor memory, for instance of the well-known ROM type. However, the program may be stored in any other suitable storage medium, such as magnetic data carrier 17*a* (such as a "floppy disc") or CD-ROM 17*b*.

The invention claimed is:

1. A method of processing first and second seismic data sets including first and second modes of seismic energy, respectively, the method comprising:

combining the first and second seismic data sets to form a third seismic data set; and determining a travel time difference through a layer between seismic energy propagating in the first mode and seismic energy propagating in the second mode based on the third seismic data set.

2. A method as claimed in claim 1 wherein the second mode has been generated by partial mode conversion of the first mode at a boundary face of a layer of a seabed.

3. A method as claimed in claim 2 wherein the boundary face is a lower boundary face of the layer.

4. A method as claimed in claim 2 wherein the layer is a surface layer or a near-surface layer.

5. A method as claimed in claim 1 wherein combining the first and second seismic data sets comprises cross-correlating the first and second seismic data sets with one another to form the third seismic data set.

6. A meted as claimed in claim 1 wherein combining the first and second seismic data sets comprises deconvoling the first and second seismic data sets with one another to form the third seismic data set.

7. A method as claimed in claim 1 wherein combining the first and second seismic data sets comprises processing the first and second seismic data sets using a bicoherence time delay method thereby to obtain the travel time difference through the layer between seismic energy propagating in the first mode and seismic energy propagating in the second mode.

8. A method as claimed in claim 1 further comprising determining a travel time through the layer of the first mode from the first seismic data set and determining a travel time through the layer of the second mode from the second seismic data set.

9. A method as claimed in claim 1, wherein the first seismic data set comprises a first component of a particle velocity and the second seismic data set comprises a second component of the particle velacity, the first and second components of particle velocity not being parallel to one another.

10. A method as claimed in claim 9 wherein the first component of the particle velocity is substantially a vertical component and the second component of the particle velocity is substantially a horizontal component.

11. A method as claimed in claim 1, wherein the first seismic data set comprises a first component of a particle velocity and the second seismic data set comprises a pressure.

12. A method as claimed in claim 1, wherein the first seismic data set comprises a first component of a particle dispiacement and the second seismic data set comprises a second component of the particle displacement, the first and second components of the particle displacement not being parallel to one another.

13. A method as claimed in claim 12 wherein the first component of the particle displacement is substantially a vertical component and the second component of the particle displacement is substantially a horizontal component.

14. A method as claimed in claim 2, wherein the first mode is a p-wave mode and the second mode generated by partial mode conversion is an s-wave mode.

15. A method as claimed in claim 2, wherein the first mode is an s-wave mode and the second mode generated by partial mode conversion is a p-wave mode.

16. A method as claimed in claim 1 further comprising forming the first and second seismic data sets by decomposing received seismic data into a p-component and an s-component.

17. A method as claimed in claim 16 wherein combining the first and second seismic data sets comprises cross-correlating the p-component and the s-component of the seismic energy with one another to form the third seismic data set.

18. A method of seismic surveying comprising the steps of:
directing seismic energy propagating in a first mode towards a boundary face of a layer of the seabed such that partial mode conversion of the seismic energy into a second mode occurs at the boundary face;
acquiring first and second seismic data sets including the first and second modes of the seismic energy, respectively, at one or more receivers;
combining the first and second seismic data sets to form a third seismic data set; and
determining a travel time difference through the layer between seismic energy propagating in the first mode and seismic energy propagating in the second mode based on the third seismic data set.

19. A method of seismic surveying as claimed in claim 18 wherein the step of acquiring first and second seismic data sets comprises acquiring first and second seismic data sets at one or more receivers disposed above the layer.

20. A method as claimed in claim 18 wherein the step of acquiring first and second seismic data sets comprises acquiring first and second seismic data sets at one or more receivers disposed on the seabed.

21. A method of seismic surveying as claimed in claim 18, and comprising directing seismic energy downwardly through the layer whereby partial mode conversion occurs upon reflection at the boundary face of seismic energy of the first mode propagating downwardly through the layer.

22. A method of seismic surveying as claimed in claim 18, and comprising directing seismic energy upwardly towards the layer whereby partial mode conversion occurs upon transmission through the boundary face of upwardly propagating seismic energy of the first mode.

23. A method of seismic surveying as claimed in claim 18, and comprising directing seismic energy towards the boundary face of the layer at such an angle as to cause seismic energy in the first mode to propagate along the boundary face.

24. A method of seismic surveying as claimed in claim 23 wherein the first mode is a p-wave made and the angle $\theta_i$ between the direction of propagation of the incident seismic energy and the normal to the boundary face satisfies $\sin\theta_i \geq \alpha_i/\alpha_2$ where $\alpha_i$ is the velocity of propagation of p-waves in the layer of the seabed and $\alpha_2$ is the velocity of propagation of p-waves in an underlying layer.

25. A method of seismic surveying as claimed in claim 23 wherein the first mode is a p-wave mode and the angle $\theta_i$ between the direction of propagation of the incident seismic energy and the normal to the boundary face satisfies $\sin\theta_i \geq \beta_1/\alpha_2$ where $\oplus_1$ if is the velocity of propagation of s-waves in the layer of the seabed and $\alpha_2$ is the velocity of propagation of p-waves in an underlying layer.

26. An apparatus for processing first and second seismic data sets including first and second modes of seismic energy, respectively, the second mode having been generated by partial mode conversion of the first mode at a boundary face of a layer of the seabed, the apparatus comprising:
means for combining the first and second seismic data sets to form a third seismic data set; and
means for determining atravel time difference through the layer between seismic energy propagating in the first made and seismic energy propagating in the second mode based on the third seismic data set.

27. An apparatus as claimed in claim 26 wherein the means for combining are adapted to cross-correlate the first and second seismic data sets with one another.

28. An apparatus as claimed in claim 26 wherein the means for combining are adapted to deconvolve the first and second seismic data sets with one another.

29. An apparatus as claimed in claim 26 wherein the means for combining are adapted to process the first and second seismic data sets using a bicoherence time delay method.

30. An apparatus as claimed in claim 26 comprising means for determining a travel time through the layer of the first mode from the first seismic data set and means for determining a travel time through the layer of the second mode from the second seismic data set.

31. An apparatus as claimed in claim 26 and comprising a programmable data processor.

32. An apparatus as claimed in claim 31, further comprising a storage medium containing a program for the programmable data processor.

* * * * *